(12) United States Patent
Hadj-Said et al.

(10) Patent No.: US 11,097,715 B2
(45) Date of Patent: Aug. 24, 2021

(54) METHOD FOR CALCULATING A CONTROL SETPOINT OF A HYBRID POWERTRAIN OF A MOTOR VEHICLE

(71) Applicants: RENAULT S.A.S., Boulogne Billancourt (FR); UNIVERSITE D'ORLEANS, Orleans (FR)

(72) Inventors: Souad Hadj-Said, Courbevoie (FR); Ahmed Ketfi-Cherif, Elancourt (FR); Guillaume Colin, Olivet (FR)

(73) Assignees: RENAULT S.A.S., Boulogne Billancourt (FR); UNIVERSITE D'ORLEANS, Orleans (FR)

( * ) Notice: Subject to any disclaimer, the term of this patent is extended or adjusted under 35 U.S.C. 154(b) by 203 days.

(21) Appl. No.: 16/489,086

(22) PCT Filed: Feb. 22, 2018

(86) PCT No.: PCT/FR2018/050417
§ 371 (c)(1),
(2) Date: Aug. 27, 2019

(87) PCT Pub. No.: WO2018/158524
PCT Pub. Date: Sep. 7, 2018

(65) Prior Publication Data
US 2020/0070807 A1    Mar. 5, 2020

(30) Foreign Application Priority Data

Mar. 1, 2017   (FR) ........................................ 1751679

(51) Int. Cl.
*B60W 20/11*      (2016.01)
*B60W 10/08*      (2006.01)
*B60W 40/10*      (2012.01)

(52) U.S. Cl.
CPC ............ *B60W 20/11* (2016.01); *B60W 10/08* (2013.01); *B60W 40/10* (2013.01); *B60W 2510/0666* (2013.01); *B60W 2510/085* (2013.01)

(58) Field of Classification Search
CPC ...... B60W 20/11; B60W 10/18; B60W 40/10; B60W 2510/0666; B60W 2510/085;
(Continued)

(56) References Cited

U.S. PATENT DOCUMENTS

| 5,789,881 | A | * | 8/1998 | Egami | ................... | B60W 10/08 |
| | | | | | | 318/139 |
| 6,098,733 | A | * | 8/2000 | Ibaraki | .................. | B60L 3/0084 |
| | | | | | | 180/65.28 |
| 2018/0319389 | A1 | * | 11/2018 | Felsch | ................. | B60W 30/182 |

FOREIGN PATENT DOCUMENTS

| DE | 102013014667 A1 | 3/2015 |
| DE | 102015201549 A1 | 7/2016 |
| WO | 2016070887 A1 | 5/2016 |

OTHER PUBLICATIONS

International Search Report, dated May 28, 2018, from corresponding PCT application No. PCT/FR2018/050417.

* cited by examiner

*Primary Examiner* — Mary Cheung
(74) *Attorney, Agent, or Firm* — Nixon & Vanderhye

(57) ABSTRACT

Disclosed is a method for calculating a control setpoint of a hybrid powertrain of a motor vehicle, the hybrid powertrain including an electric motor and an internal combustion engine (ICE) that is equipped with a gearbox and that is supplied with fuel. The method includes: acquiring a value relative to a power requested at the vehicle's drive wheels; and determining the contribution of the electric motor and the ICE in order to satisfy the request for power at the drive (Continued)

wheels. The determination step involves calculating a triplet of three values, one value relating to the electromechanical power that the electric motor must provide, one value relating to the thermomechanical power that the ICE must provide and one value relating to the ratio that needs to be engaged in the gearbox, this triplet minimising the fuel consumption of the ICE and the current consumption of the electric motor.

20 Claims, 3 Drawing Sheets

(58) Field of Classification Search
CPC ......... B60W 20/30; B60W 2050/0013; B60W 2050/0022; B60W 2050/0041; B60W 2510/0623; B60W 2510/244; B60W 2520/10; B60W 2540/10; B60W 2710/0677; B60W 2710/086; B60W 2710/1005; B60W 10/06; B60W 10/11; B60W 30/188; B60Y 2200/92; Y02T 10/72; Y02T 10/84; Y02T 10/40; Y02T 10/62

See application file for complete search history.

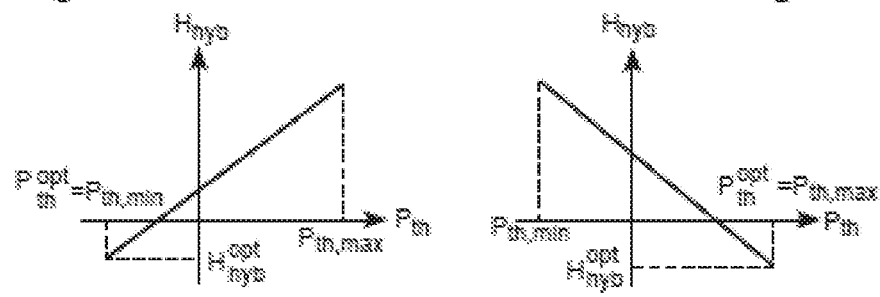
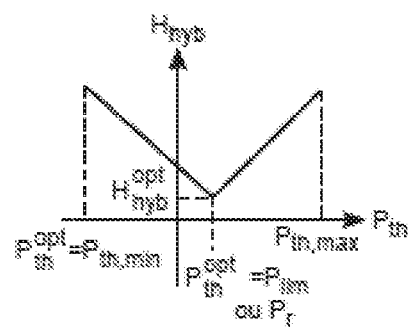
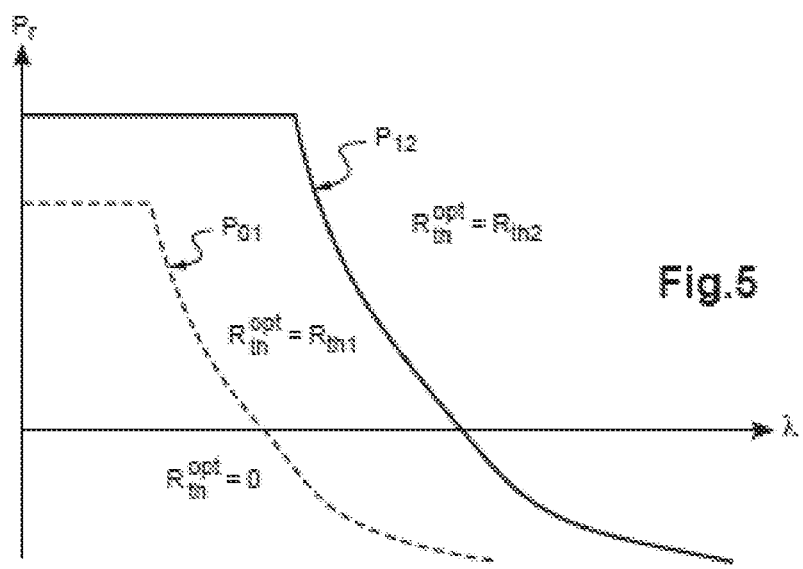

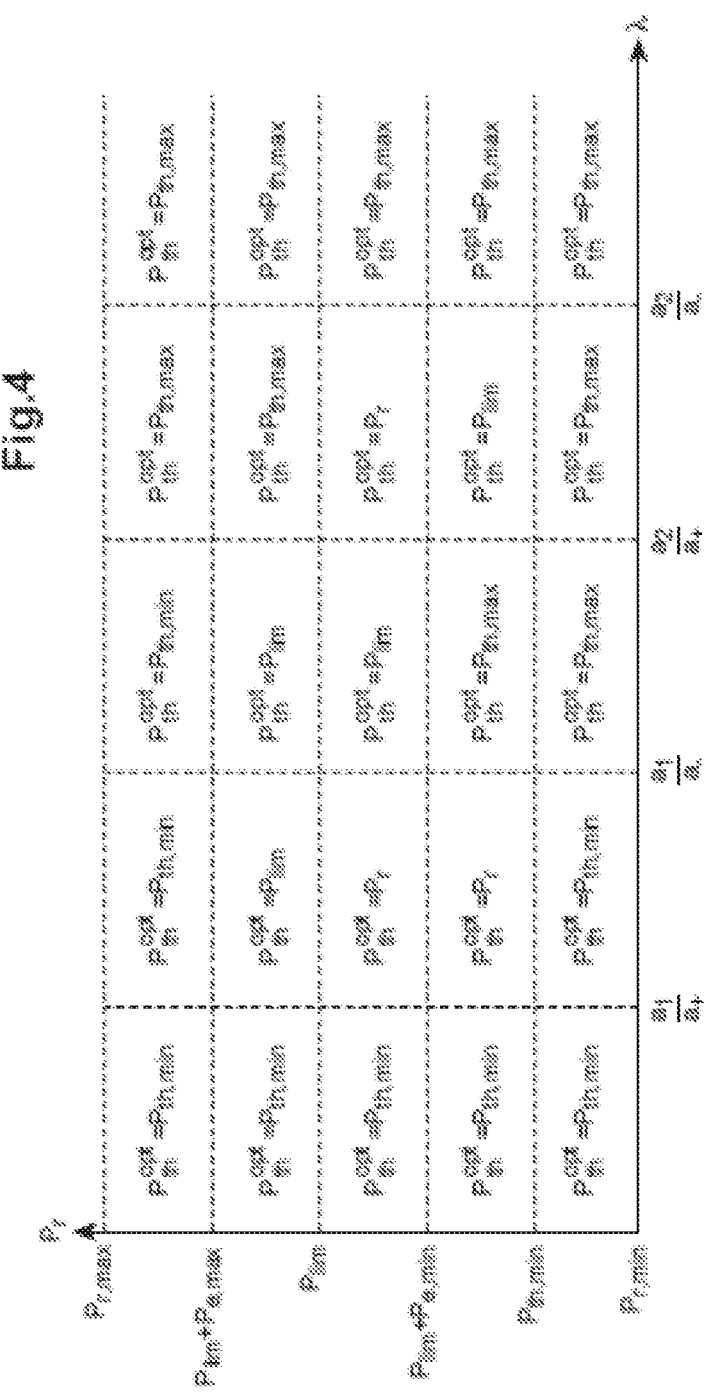

METHOD FOR CALCULATING A CONTROL SETPOINT OF A HYBRID POWERTRAIN OF A MOTOR VEHICLE

TECHNICAL FIELD TO WHICH THE INVENTION RELATES

The present invention relates in general terms to motor vehicles equipped with hybrid powertrains, that is to say powertrains comprising an electric motor and an internal combustion engine provided with a gearbox.

It relates more particularly to a method for calculating a control setpoint of such a powertrain, which comprises:
- a step of acquiring a value relating to a power demanded at the drive wheels of the motor vehicle, and
- a step of determining the contribution of the electric motor and that of the internal combustion engine in order to satisfy the power demand at the drive wheels.

TECHNOLOGICAL BACKGROUND

A hybrid vehicle comprises a conventional thermal traction chain (with an internal combustion engine, a fuel tank and a gearbox) and an electric traction chain (with a traction battery and at least one electric motor).

Such a hybrid vehicle is able to be driven solely by its electric traction chain, or solely by its thermal traction chain, or simultaneously by its two electrical and thermal traction chains.

It is always sought to minimise the current and fuel consumption of the engine and motor in order best to reduce discharges of polluting components into the atmosphere and to guarantee the best range possible for the vehicle.

To achieve this objective, it is sought to best distribute the total power to be supplied between the electric motor and the internal combustion engine.

There is thus known from the document WO 2016/070887 a convex optimisation method that makes it possible, as a general rule, to find a good distribution between the electromechanical power supplied by the electric motor and the thermomechanical power supplied by the internal combustion engine.

The applicant however found that this method did not always give results as effective as desired.

SUBJECT MATTER OF THE INVENTION

In order to remedy this drawback, the present invention proposes to integrate, in the aforementioned convex optimisation method, a third parameter that is the gearbox ratio.

More particularly, a control method is proposed according to the invention as defined in the introduction, in which provision is made, at the determination step, to calculate a triplet of three values making it possible to minimise the fuel consumption of the internal combustion engine and the current consumption of the electric motor, these three values relating respectively to:
- the electromechanical power that the electric motor must supply,
- the thermomechanical power that the internal combustion engine must supply, and
- the ratio that must be engaged on the gearbox.

The objective may for example be more precisely to minimise the sum of the fuel consumption of the internal combustion engine and the current consumption of the electric motor.

Thus, by means of the invention, the triplet of values found makes it possible to ensure that the gearbox ratio engaged is the best and that, on this box ratio, the distribution between electromechanical power and thermomechanical power is optimum.

As will appear clearly in the remainder of this disclosure, this solution has the advantage of being robust and easy to implement whatever the type of electric motor, the type of internal combustion engine and the type of traction battery used.

Other advantageous and non-limitative features of the calculation method according to the invention are as follows:
- the triplet is calculated by means of an analytical model for fuel consumption of the internal combustion engine and an analytical model for current consumption of the electric motor;
- the analytical model for fuel consumption of the internal combustion engine as a function of the value relating to the thermomechanical power that the internal combustion engine must supply is given by the following equation:

$$Q(P_{th}) = \begin{cases} a_1 \cdot P_{th} + Q_0 & \text{if } P_{th} \text{ lies between } P_{th,min} \text{ and } P_{lim} \\ a_2 \cdot (P_{th} - P_{lim}) + Q_{lim} & \text{if } P_{th} \text{ lies between } P_{lim} \text{ and } P_{th,max} \end{cases}$$

with $a_1$ and $a_2$ two predetermined constants such that $a_1 < a_2$, and with $Q_0$, $Q_{lim}$, $P_{th,min}$, $P_{th,max}$ and $P_{lim}$ parameters calculated according to the operating point of the internal combustion engine (speed and temperature);

$Q_0$, $Q_{lim}$ are parameters relating to the fuel consumption limits of the internal combustion engine, at a given speed;

$P_{th,min}$, $P_{th,max}$ are parameters relating to the power limits that the internal combustion engine can develop, at a given speed;

$P_{lim}$ is a power parameter;

the analytical model for fuel consumption of the electric motor as a function of the value relating to the electromechanical power that the electric motor must supply is given by the following equation:

$$P_{bat}(P_m) = \begin{cases} a_- \cdot P_m + b & \text{if } P_m \text{ lies between } P_{e,min} \text{ and } 0 \\ a_+ \cdot P_m + b & \text{if } P_m \text{ lies between } 0 \text{ and } P_{e,max} \end{cases}$$

with $a_-$, $a_+$, $b$, $P_{e,min}$, $P_{e,max}$ parameters calculated as a function of the operating point of the electric motor (speed, supply voltage and temperature), such that $a_-$ is less than $a_+$;

$P_{e,min}$, $P_{e,max}$ are parameters relating to the power limits that the electric motor can develop, at a given speed;

the triplet is obtained by minimising a Hamiltonian that is defined as a function of the current consumption of the electric motor and the fuel consumption of the internal combustion engine;

said Hamiltonian is written in the form:

$$H_{hyb}(P_{th}, P_r, \lambda) = Q(P_{th}) + \lambda \cdot P_{bat}(P_m), \text{ with}$$

$Q(P_{th})$ which represents the fuel consumption of the internal combustion engine, $P_{bat}(P_m)$ which represents the current consumption of the electric motor, and $\lambda$ a weighting factor, and the value relating to the thermomechanical power of said triplet is determined as a function of said weighting factor and of the value relating to the power demanded at the drive wheels;

the value relating to the thermomechanical power of said triplet is selected from the following values:
the parameter $P_{th,min}$,
the parameter $P_{th,max}$,
the parameter $P_{lim}$, and
the value $P_r$ relating to the power demanded at the drive wheels;

the value of the triplet that relates to the ratio that must be engaged on the gearbox is obtained by calculating the value of said Hamiltonian for each ratio that can be engaged on the gearbox, and then selecting the ratio associated with the lowest of the values of said Hamiltonian;

the value of the triplet that relates to the ratio that must be engaged on the gearbox is obtained as a function of said weighting factor and of the value relating to the power demanded at the drive wheels; and the value relating to the electromechanical power of said triplet is deduced as a function of the value relating to the power demanded at the drive wheels and the value relating to the thermomechanical power of said triplet.

DETAILED DESCRIPTION OF AN EXAMPLE EMBODIMENT

The description that follows with regard to the accompanying drawings, given by way of non-limitative examples, will give a clear understanding of what the invention consists and how it can be implemented.

On the accompanying drawings:

FIGS. 3A to 3C are graphs illustrating a way of obtaining the optimum value of a thermal power according to the method in accordance with the invention;

FIG. 4 is a table illustrating another way of obtaining the optimum value of the thermal power; and FIG. 5 is a graph illustrating a way of obtaining the optimum value of a gearbox ratio according to a method in accordance with the invention.

Conventionally, a motor vehicle comprises a chassis that supports in particular a powertrain, bodywork elements and passenger-compartment elements.

Figure 1:
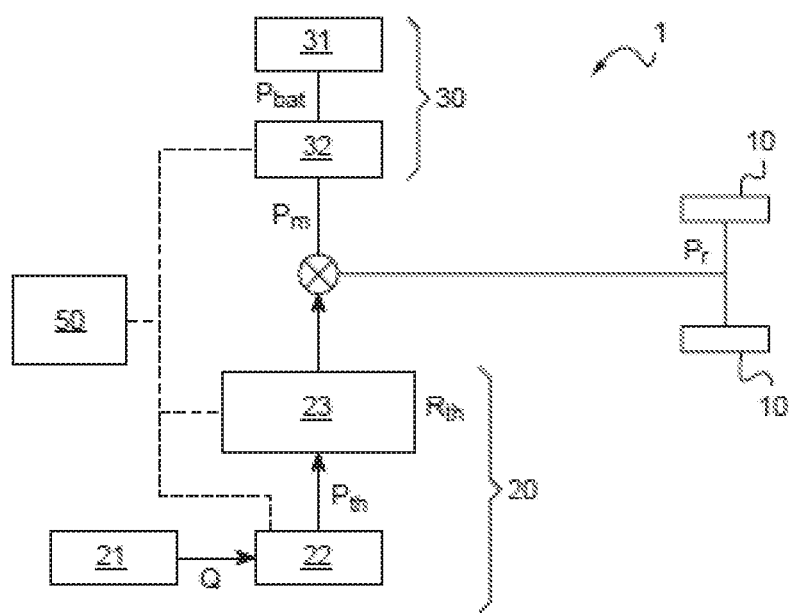
FIG. 1 is a schematic figure of a traction chain of a hybrid motor vehicle.

As shown by FIG. 1, in a motor vehicle 1 of the hybrid type, the hybrid powertrain comprises a thermal traction chain 20 and an electric traction chain 30.

The thermal traction chain 20 comprises in particular a fuel tank 21, an internal combustion engine 22 supplied with fuel by the tank, and a gearbox 23 coupled, at its input, to the internal combustion engine, and, at the output, to the drive wheels 10 of the motor vehicle.

The electric traction chain 30 for its part comprises a traction battery 31 and one (or in a variant a plurality of) electric motor 32 supplied with electric current by the traction battery 31 and the output shaft of which is coupled to the drive wheels 10 of the motor vehicle.

These two traction chains therefore join to rotate the drive wheels 10 of the motor vehicle.

The motor vehicle 1 moreover comprises an electronic control unit (ECU), here referred to as the computer 50, for controlling the aforementioned two traction chains (in particular the powers developed by the electric motor 32 and by the internal combustion engine 22).

The computer 50 comprises a processor and a memory that records data used in the context of the method described below.

This memory records in particular a table of the type illustrated in FIG. 4 (which will be detailed later in this disclosure).

It also records a computer application, consisting of computer programs comprising instructions, the execution of which by the processor allows the implementation by the computer 50 of the method described below.

For implementing the invention, the computer 50 is connected to sensors.

It is in particular connected to a sensor for measuring to what extent the vehicle must accelerate or decelerate. It may be a sensor measuring the position of the accelerator pedal of the vehicle, or a sensor measuring the speed of the vehicle (in the case where the vehicle must follow a speed instruction imposed by the driver).

Whatever the case, the computer 50 is thus able to acquire the value of a data item relating to the power required by the driver of the vehicle in order to make this vehicle travel with the required dynamics. It will be considered here that the computer 50 acquires more precisely the value of a power that the drive wheels 10 must receive, hereinafter referred to as "power at the wheels $P_r$".

Other concepts for giving a clear understanding of the invention can be defined here.

The power supplied solely by the electric motor 32 at the drive wheels 10 will here be referred to as "electromechanical power $P_m$".

The power supplied by the traction battery 31 to the electric motor 32 will here be referred to as "electric power $P_{bat}$".

The power supplied solely by the internal combustion engine 22 to the gearbox 23 will here be referred to as "thermomechanical power $P_{th}$".

The ratio of the gearbox 23 will here be referred to as "box ratio $R_{th}$".

The fuel consumption of the internal combustion engine 22 will be referred to as "fuel flow Q".

The state of charge of the traction battery 31, expressed as a percentage, will be referred to as the charge level SOC".

The subject matter of the invention consists of determining the contribution that the electric motor 32 and the internal combustion engine 22 must each provide to satisfy the power demand at the wheels $P_r$ required by the driver, with the most suitable box ratio $R_{th}$, in order to guarantee:
minimum fuel consumption, and
an electrical charge level SOC higher than a threshold (at the end for example of a journey stored in a navigation and geolocation apparatus).

Expressed otherwise, the subject matter of the invention that will be described hereinafter will be to find, according to the required power at the wheels $P_r$, the triplet $\{P_{th}^{opt}, R_{th}^{opt}, P_m^{opt}\}$ that guarantees a minimum energy consumption (the exponent "opt" meaning that it is the optimum value).

As will appear clearly hereinafter, taking the box ratio $R_{th}$ into account in the method makes the problem hybrid in the mathematical sense.

To ensure good comprehension of the invention, the method for achieving the calculation of the triplet $\{P_{th}^{opt}, R_{th}^{opt}, P_m^{opt}\}$ will be clearly detailed in the following disclosure, but in practice the method actually implemented by the computer 50 installed in the vehicle will be simpler. The expression "in practice" will then be used hereinafter to distinguish from the whole of this disclosure the steps that will actually be implemented by the computer 50.

The method according to the invention is based on an analytical modelling of the fuel consumption of the internal combustion engine 22 and the electric current consumption of the electric motor 32.

The analytical model of the fuel flow Q of the internal combustion engine 22 as a function of the thermomechanical power $P_{th}$ is here given by the following equation:

$$Q(P_{th}) = \begin{cases} a_1 \cdot P_{th} + Q_0 & \text{if } P_{th} \in [P_{th,min}; P_{lim}] \\ a_2 \cdot (P_{th} - P_{lim}) + Q_{lim} & \text{if } P_{th} \in [P_{lim}; P_{th,max}] \end{cases} \quad [\text{eq1}]$$

with $a_1$ and $a_2$ two constants such that $a_1 < a_2$.

In this model, the constants $a_1$ and $a_2$ are obtained experimentally for each model of motor vehicle (by carrying out a plurality of tests on the model of vehicle in question and estimating the values thereof by the least squares method).

The parameters $Q_0$, $Q_{lim}$, $P_{th,min}$, $P_{lim}$ and $P_{th,max}$ for their part are variables that vary according to the speed $\omega_{th}$ of the internal combustion engine 22.

These variables are modelled as follows:

$Q_0(\omega_{th}) = q_2 \cdot \omega_{th}^2 + q_1 \cdot \omega_{th} + q_0$, $Q_{lim}(\omega_{th}) = a_1 \cdot P_{lim} + Q_0(\omega_{th})$, $P_{lim}(\omega_{th}) = p_1 \cdot \omega_{th} + p_0$, $P_{th,min}(\omega_{th}) = k_1 \cdot \omega_{th} + k_0$, $P_{th,max}(\omega_{th}) = -Q_0(\omega_{th})/a_1$.

In this modelling, $q_0$, $q_1$, $q_2$, $p_0$, $p_1$, $k_0$ and $k_1$ are constants obtained experimentally for each model of motor vehicle.

The analytical model of the electric power $P_{bat}$ consumed according to the electromechanical power $P_m$ that the electric motor 32 must supply is here given by the following equation:

$$P_{bat}(P_m) = \begin{cases} a_- \cdot P_m + b & \text{if } P_m \in [P_{e,min}; 0] \\ a_+ \cdot P_m + b & \text{if } P_m \in [0; P_{e,max}] \end{cases} \quad [\text{eq2}]$$

with $a_- < a_+$.

In this model, the parameters $a_-$, $a_+$, $b$, $P_{e,min}$ and $P_{e,max}$ are variables that vary according to the rotation speed of the electric motor 32.

The mechanical balance of the hybrid powertrain is moreover given by the following equation:

$P_r = P_{th} + P_m$ [eq3]

As disclosed above, the computer 50 will seek to optimise the thermomechanical power $P_{th}$, the electromechanical power $P_m$, and the box ratio $R_{th}$ so as to minimise the energy consumption of the hybrid powertrain on the chosen journey.

The method used for solving this optimisation problem is here based on Pontryagin's minimum principle. This principle applies to a particular mathematical operator: a Hamiltonian that is a function of the electromechanical power $P_m$ that the electric motor 32 must supply and the thermomechanical power $P_{th}$ that the internal combustion engine 22 must supply.

According to Pontryagin's minimum principle, this Hamiltonian must be minimised in order to find the optimum values sought.

This Hamiltonian could be defined in various ways.

It is expressed here in the form of the sum firstly of the fuel flow Q and secondly the product of the electrical power $P_{bat}$ consumed and a weighting factor $\lambda$ (also referred to as "equivalence factor").

The Hamiltonian is thus expressed more precisely in the form:

$H_{hyb}(P_{th}, P_m, \lambda) = Q(P_{th}) + \lambda \cdot P_{bat}(P_m)$ [eq4]

The weighting factor $\lambda$ is chosen so as to ensure, at a given moment, that the traction battery 31 has a charge level SOC above a predetermined threshold.

It is thus determined as a function of at least the instantaneous charge level SOC of the traction battery 31.

By way of example, it can be chosen as a function at least of the instantaneous charge level SOC of the traction battery 31 and as a function of a threshold above which it is wished for the charge level SOC to be situated at the end for example of the journey stored in the navigation and geolocation apparatus.

By combining equations eq3 and eq4, the following can be written:

$H_{hyb}(P_{th}, P_r, \lambda) = Q(P_{th}) + \lambda \cdot P_{bat}(P_r - P_{th})$ [eq5]

or, by means of equations eq1 and eq2:

$H_{hyb}(P_{th}, P_r, \lambda) = A_1 \cdot P_{th} + A_0 + \lambda \cdot (B_1 (P_r - P_{th}) + b)$ [eq6]

That is to say:

$H_{hyb}(P_{th}, P_r, \lambda) = (A_1 - \lambda \cdot B_1) \cdot P_{th} + A_0 + \lambda \cdot b + \lambda \cdot B_1 \cdot P_r$ [eq7]

In equations eq6 and eq7, the coefficients $A_0$, $A_1$ and $B_1$ have values variable according to the values of the thermomechanical power $P_{th}$ and the electromechanical power $P_m$.

Having regard to equations eq1 and eq2, the following can in fact be written:

$$A_0 = \begin{cases} Q_0 & \text{if } P_{th} \in [P_{th,min}; P_{lim}] \\ -a_2 \cdot P_{lim} + Q_{lim} & \text{if } P_{th} \in [P_{lim}; P_{th,max}] \end{cases} \quad [\text{eq8}]$$

$$A_1 = \begin{cases} a_1 & \text{if } P_{th} \in [P_{th,min}; P_{lim}] \\ a_2 & \text{if } P_{th} \in [P_{lim}; P_{th,max}] \end{cases} \quad [\text{eq9}]$$

$$B_1 = \begin{cases} a_- & \text{if } P_m \in [P_{e,min}; 0] \\ a_+ & \text{if } P_m \in [0; P_{e,max}] \end{cases} \quad [\text{eq10}]$$

Figure 2:
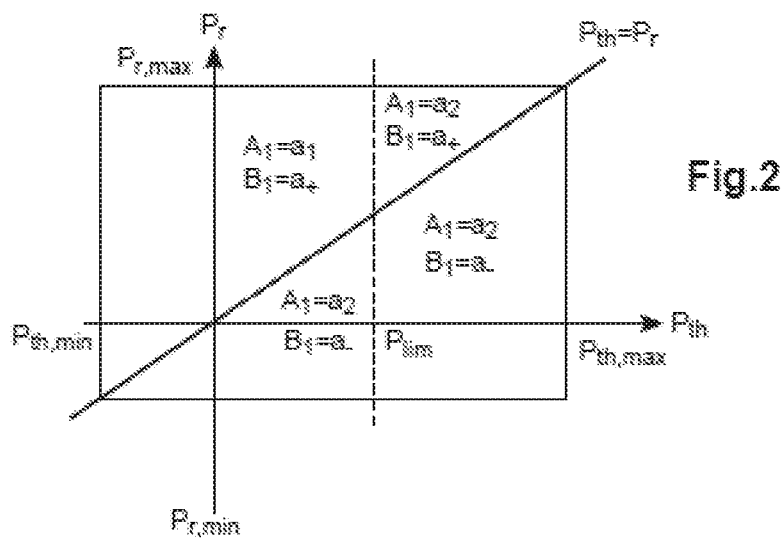
FIG. 2 is a graph illustrating a way of obtaining the mathematical expression of a Hamiltonian according to a method in accordance with the invention.

As shown by FIG. 2, the coefficients $A_0$, $A_1$ and $B_1$ have values that can then easily be determined according to the thermomechanical power $P_{th}$, the power at the wheels $P_r$ and the parameter $P_{lim}$.

It is understood from equation eq7 that the Hamiltonian is expressed in the form of an affine function of the thermomechanical power $P_{th}$.

The optimum thermomechanical power $P_{th}$, denoted $P_{th}^{opt}$, is the one that minimises the Hamiltonian. It will therefore be understood that the value thereof can be determined as a function of the sign of the term "A1–$\lambda$·B1", and that the value thereof depends on the weighting factor $\lambda$ and the power at the wheels $P_r$.

More precisely, the Hamiltonian can have four possible slopes, namely: $(a_1 - \lambda \cdot a_+)$, $(a_1 - \lambda \cdot a_-)$, $(a_2 - \lambda \cdot a_+)$ and $(a_2 - \lambda \cdot a_-)$.

The first two of these four cases are shown in FIGS. 3A and 3B, and the other two are illustrated in FIG. 3C.

In practice, the on-board computer 50 can then very simply determine the optimum thermomechanical power $P_{th}^{opt}$. For this, it will suffice for it in fact then to read a mapping stored in the read only memory of the computer 50, this mapping being illustrated in FIG. 4.

As shown clearly by FIGS. 3A to 3C in FIG. 4, the resolution of the minimum principle indicates in fact that the optimum thermomechanical power $P_{th}^{opt}$ can take one of the following four values:
- the value of the parameter $P_{th,min}$,
- the value of the parameter $P_{th,max}$,
- the value of the parameter $P_{lim}$, and
- the value of the power at the wheels $P_r$.

Once the computer 50 has read in this mapping the value of the optimum thermomechanical power $P_{th}^{opt}$, it can simply calculate the value of the optimum electromechanical power $P_m^{opt}$, by means of equation eq3.

It then remains to determine the optimum box ratio $R_{th}^{opt}$.

The box ratio $R_{th}$ can have several discrete values, which can be written:

$$R_{th} = \{0, 1, 2, \ldots, N\}, \quad [eq11]$$

with 0 corresponding to the case where the internal combustion engine 22 is stopped, and N corresponding to the number of ratios of the gearbox 23.

By replacing in equation eq7 the term $P_{th}$ with the term $P_{th}^{opt}$, the expression of $H_{hyb}^{opt}$ is obtained.

The value of this optimum Hamiltonian $H_{hyb}^{opt}$ varies according to the box ratio $R_{th}$ used. It will then be possible to write, by simplification, this optimum Hamiltonian in the following way: $H_{hyb}^{opt}(R_{th})$.

In order to determine the optimum box ratio $R_{th}^{opt}$, Pontryagin's minimum principle can once again be applied, discretely, which can be written:

$$R_{th}^{opt} = \arg(\min_{R_{th}} H_{hyb}^{opt}(R_{th})) \quad [eq12]$$

Expressed otherwise, the optimum box ratio $R_{th}^{opt}$ is the one for which the optimum Hamiltonian $H_{hyb}^{opt}$ is the smallest.

Resolution of equation eq12 then amounts to:
- calculating the optimum Hamiltonian $H_{hyb}^{opt}$ for each box ratio $R_{th}$, and then
- selecting the box ratio $R_{th}$ for which the optimum Hamiltonian $H_{hyb}^{opt}$ is the lowest.

For this purpose, it is possible to operate in various ways.

A simple way of solving equation eq12 can consist of studying the sign of the differences between each pair of optimum Hamiltonian values $H_{hyb}^{opt}(0)$, $H_{hyb}^{opt}(1)$, ... $H_{hyb}^{opt}(N)$.

For clarity of the disclosure, in order to simplify the solving of this equation, it will be considered that the gearbox here comprises only two gear ratios, denoted $R_{th1}$ and $R_{th2}$.

Solving equation eq12 then amounts to studying the sign of the following differences:

$$\begin{cases} H_{hyb}^{opt}(R_{th1}) - H_{hyb}^{opt}(0) \\ H_{hyb}^{opt}(R_{th1}) - H_{hyb}^{opt}(R_{th2}) \end{cases}$$

In the case where the internal combustion engine is stopped, the thermomechanical power $P_{th}$ is zero, and the fuel rate is zero, so that equation eq7 can be written in the form:

$$H_{hyb}^{opt}(0) = \lambda \cdot b + \lambda \cdot B_1 \cdot P_r \quad [eq12]$$

In order to clearly understand the way the problem is solved, it is then possible to consider a particular example in which the assumption is made that the situation is as follows:

$$A_1(R_{th1}) = a_1,$$

$$A_0(R_{th1}) = Q_0,$$

$$B_1(R_{th1}) = a_+,$$

$$B_1(0) = a_-,$$

$$P_{th}^{opt}(R_{th1}) = P_{lim}.$$

Therefore considering only the gear ratios 0 and $R_{th1}$, it is then possible to write:

$$H_{hyb}^{opt}(R_{th1}) - H_{hyb}^{opt}(0) = a_1 \cdot P_{lim} + Q_0 + \lambda \cdot (a_+ \cdot (P_r - P_{lim}) + b) - \lambda \cdot (a_- \cdot P_r + b)$$

Three cases can then be envisaged:

If $P_r < \dfrac{\lambda \cdot a_+ \cdot P_{lim} - Q_{lim}}{\lambda \cdot (a_+ - a_-)}$ Then $H_{hyb}^{opt}(R_{th1}) < H_{hyb}^{opt}(0)$ so that $R_{th}^{opt} = "0"$.

If $P_r > \dfrac{\lambda \cdot a_+ \cdot P_{lim} - Q_{lim}}{\lambda \cdot (a_+ - a_-)}$ Then $H_{hyb}^{opt}(R_{th1}) > H_{hyb}^{opt}(0)$ so that $R_{th}^{opt} = R_{th1}$.

If $P_r = \dfrac{\lambda \cdot a_+ \cdot P_{lim} - Q_{lim}}{\lambda \cdot (a_+ - a_-)} \quad [eq13]$ Then $H_{hyb}^{opt}(R_{th1}) = H_{hyb}^{opt}(0)$ so that $R_{th}^{opt} = R_{th1} = "0"$.

As shown by FIG. 5, equation eq13 therefore defines a curve $P_{01}$ that separates the case where the optimum box ratio $R_{th}^{opt}$ is 0 from the case where the optimum box ratio $R_{th}^{opt}$ is $R_{th1}$.

In this particular example, the assumptions can be supplemented as follows:

$$A_1(R_{th1}) = a_1,$$

$$A_0(R_{th1}) = Q_0,$$

$$B_1(R_{th1}) = a_+,$$

$$P_{th}^{opt}(R_{th1}) = P_{lim}$$

$$A_1(R_{th2}) = a_1,$$

$$A_0(R_{th2}) = Q_0,$$

$$B_1(R_{th2}) = a_+,$$

$$P_{th}^{opt}(R_{th2}) = P_r.$$

Considering only the gear ratios $R_{th1}$ and $R_{th2}$, the following can then be written:

$$H_{hyb}^{opt}(R_{th1}) - H_{hyb}^{opt}(R_{th2}) = a_1 \cdot P_{lim}^1 + Q_0^1 + \lambda \cdot (a_+ \cdot (P_r - P_{lim}^1)) - a_1 \cdot P_r - Q_0^2$$

It will be noted that, in this equation, the exponents 1 and 2 make it possible to indicate whether the parameters to which they refer are calculated in the case where the first box ratio $R_{th1}$ is engaged or in the case where the second box ratio $R_{th2}$ is engaged (the speed $\omega_{th}$ of the engine is not in fact the same, so that these parameters do not have identical values in these two cases).

Three cases can then be envisaged:

$$\text{If } P_r < \frac{\lambda \cdot a_+ \cdot P_{lim}^1 + Q_0 - Q_{lim}^1}{\lambda \cdot a_+ - a_1}$$

Then $H_{hyb}^{opt}(R_{th1}) < H_{hyb}^{opt}(R_{th2})$ so that $R_{th}^{opt} = R_{th1}$.

$$\text{If } P_r > \frac{\lambda \cdot a_+ \cdot P_{lim}^1 + Q_0 - Q_{lim}^1}{\lambda \cdot a_+ - a_1}$$

Than $H_{hyb}^{opt}(R_{th1}) > H_{hyb}^{opt}(R_{th2})$ so that $R_{th}^{opt} = R_{th2}$.

$$\text{If } P_r = \frac{\lambda \cdot a_+ \cdot P_{lim}^1 + Q_0 - Q_{lim}^1}{\lambda \cdot a_+ - a_1} \qquad [\text{eq14}]$$

Then $H_{hyp}^{opt}(R_{th1}) > H_{hyb}^{opt}(R_{th2})$ so that $R_{th}^{opt} = R_{th1} = R_{th2}$ As shown by FIG. 5, equation eq14 therefore defines a curve $P_{12}$ that separates the case where the optimum box ratio $R_{th}^{opt}$ is $R_{th2}$ from the case where the optimum box ratio $R_{th}^{opt}$ is $R_{th1}$.

In practice, the computer 50 can then determine the optimum box ratio $R_{th}^{opt}$ very simply since it will suffice for it, as shown in FIG. 5, to compare the power at the wheels $P_r$ with the corresponding values of the curves $P_{01}$ and $P_{12}$, taking account of the weighting factor $\lambda$.

The equations of these curves must then simply be stored in the memory of the computer 50 in order to enable the computer 50 to determine the optimum box ratio $R_{th}^{opt}$.

It should be noted here first of all that the first curve $P_{01}$ will enable the computer 50 to distinguish the case where the motor vehicle must be propelled in "all electric" mode ($R_{th}^{opt}=0$) from the case where the internal combustion engine 22 must be started ($R_{th}^{opt}=R_{th1}$).

It should next be noted that a certain number of hypotheses on the parameters $A_1$, $A_0$, $B_1$ have here been envisaged in defining two curves $P_{01}$, $P_{12}$. There will of course exist more curves to be stored in the memory of the computer 50, in order to be able to envisage all the possible hypotheses.

Finally, it should be noted that, in defining two curves $P_{01}$, $P_{12}$, it was assumed that the gearbox 23 comprised two ratios. Naturally, it will be necessary to define as many curves as there will be box ratios.

In conclusion, the method implemented by the computer 50 for determining the triplet $\{P_{th}^{opt}, R_{th}^{opt}, P_m^{opt}\}$ will be simple and will require fairly low computing time and resource in terms of computing power.

This method will furthermore ensure continuity and regularity of the commands transmitted to the electric motor 32 and to the internal combustion engine 22, which will avoid any jolt that might be felt by the passengers of the vehicle.

This method can be applied very easily to any type of hybrid motor vehicle.

The present invention is in no way limited to the embodiment described and depicted, but a person skilled in the art will be able to add any variant thereto in accordance with the invention. It would thus be possible to use other models representing the energy consumption of the motor and engine (in particular quadratic models).

The invention claimed is:

1. Method for calculating a control setpoint of a hybrid powertrain of a motor vehicle, said hybrid powertrain comprising an electric motor that is supplied with current and an internal combustion engine that is equipped with a gearbox and is supplied with fuel, said method comprising:
   a step of acquiring a value relating to a power demanded at the drive wheels of the motor vehicle, and
   a step of determining the contribution of the electric motor and of the internal combustion engine in order to satisfy the power demand at the drive wheels,
   wherein, at the determination step, a triplet of three values is calculated, including a value relating to the electromechanical power that the electric motor must supply, a value relating to the thermomechanical power that the internal combustion engine must supply and a value relating to the ratio that must be engaged on the gearbox in order to minimise the sum of the fuel consumption of the internal combustion engine and the current consumption of the electric motor.

2. Calculation method according to claim 1, wherein the triplet is calculated by means of an analytical model of fuel consumption of the internal combustion engine and an analytical model of current consumption of the electric motor.

3. Calculation method according to claim 2, in which the analytical model of fuel consumption of the internal combustion engine as a function of the value relating to the thermomechanical power that the internal combustion engine must supply is given by the following equation:

$$Q(P_{th}) = \begin{cases} a_1 \cdot P_{th} + Q_0 & \text{if } P_{th} \text{ lies between } P_{th,min} \text{ and } P_{lim} \\ \alpha_2 \cdot (P_{th} - P_{lim}) + Q_{lim} & \text{if } P_{th} \text{ lies between } P_{lim} \text{ and } P_{th,max} \end{cases}$$

with $a_1$ and $a_2$ two predetermined constants such that $a_1 < a_2$, and with $Q_0$, $Q_{lim}$, $P_{th,min}$, $P_{th,max}$, $P_{lim}$ parameters calculated as a function of the operating point of the internal combustion engine.

4. Calculation method according to claim 3, wherein:

the analytical model of current consumption of the electric motor as a function of the value relating to the electromechanical power that the electric motor must supply is given by the following equation:

$$P_{bat}(P_m) = \begin{cases} a_- \cdot P_m + b & \text{if } P_m \text{ lies between } P_{e,min} \text{ and } 0 \\ a_+ \cdot P_m + b & \text{if } P_m \text{ lies between } 0 \text{ and } P_{e,max} \end{cases}$$

with $a_-$, $a_+$, $b$, $P_{e,min}$, $P_{e,max}$ parameters calculated as a function of the operating point of the electric motor such that $a_-$ is less than $a_+$, the triplet is obtained by minimising a Hamiltonian that is defined as a function of the current consumption of the electric motor and the fuel consumption of the internal combustion engine said Hamiltonian is written in the form:

$$H_{hyb}(P_{th}, P_r, \lambda) = Q(P_{th}) + \lambda \cdot P_{bat}, \text{ with}$$

$Q(P_{th})$ which represents the fuel consumption of the internal combustion engine, $P_{bat}(P_m)$ which represents the current consumption of the electric motor, and λ a weighting factor, and wherein the value relating to the thermomechanical power of said triplet is determined as a function of said weighting factor and of the value relating to the power demanded at the drive wheels.

5. Calculation method according to claim 4, wherein the value relating to the thermomechanical power of said triplet is selected from the following values:

the parameter $P_{th,min}$, the parameter $P_{th,max}$, the parameter $P_{lim}$, and the value $P_r$ relating to the power demanded at the drive wheels.

6. Calculation method according to claim 4, wherein the value of the triplet that relates to the ratio that must be engaged on the gearbox is obtained by:

calculating said Hamiltonian for each ratio that can be engaged on the gearbox, and then selecting the ratio associated with the lowest of the values of said Hamiltonian, and wherein the value of the triplet that relates to the ratio that must be engaged on the gearbox is obtained as a function of said weighting factor and of the value relating to the power demanded at the drive wheels.

7. Calculation method according to claim 3, wherein the analytical model of current consumption of the electric motor as a function of the value relating to the electromechanical power that the electric motor must supply is given by the following equation:

$$P_{bat}(P_m) = \begin{cases} a_- \cdot P_m + b \text{ if } P_m \text{ lies between } P_{e,min} \text{ and } 0 \\ a_+ \cdot P_m + b \text{ if } P_m \text{ lies between } 0 \text{ and } P_{e,max} \end{cases}$$

with $a_-$, $a_+$, b, $P_{e,min}$, $P_{e,max}$ parameters calculated as a function of the operating point of the electric motor such that $a_-$ is less than $a_+$.

8. Calculation method according to claim 7, wherein the triplet is obtained by minimising a Hamiltonian that is defined as a function of the current consumption of the electric motor and the fuel consumption of the internal combustion engine.

9. Calculation method according to claim 3, wherein the triplet is obtained by minimising a Hamiltonian that is defined as a function of the current consumption of the electric motor and the fuel consumption of the internal combustion engine.

10. Calculation method according to claim 3, wherein the value relating to the electromechanical power of said triplet is deduced as a function of the value relating to the power demanded at the drive wheels and of the value relating to the thermomechanical power of said triplet.

11. Calculation method according to claim 2, wherein the triplet is obtained by minimising a Hamiltonian that is defined as a function of the current consumption of the electric motor and the fuel consumption of the internal combustion engine.

12. Calculation method according to claim 11, wherein the value of the triplet that relates to the ratio that must be engaged on the gearbox is obtained by:

calculating said Hamiltonian for each ratio that can be engaged on the gearbox, and then selecting the ratio associated with the lowest of the values of said Hamiltonian.

13. Calculation method according to claim 11, wherein:

the analytical model of current consumption of the electric motor as a function of the value relating to the electromechanical power that the electric motor must supply is given by the following equation:

$$P_{bat}(P_m) = \begin{cases} a_- \cdot P_m + b \text{ if } P_m \text{ lies between } P_{e,min} \text{ and } 0 \\ a_+ \cdot P_m + b \text{ if } P_m \text{ lies between } 0 \text{ and } P_{e,max} \end{cases}$$

with $a_-$, $a_+$, b, $P_{e,min}$, $P_{e,max}$ parameters calculated as a function of the operating point of the electric motor such that $a_-$ is less than $a_+$, the triplet is obtained by minimising a Hamiltonian that is defined as a function of the current consumption of the electric motor and the fuel consumption of the internal combustion engine said Hamiltonian is written in the form:

$H_{hyb}(P_{th}, P_r, \lambda) = Q(P_{th}) + \lambda \cdot P_{bat}$, with $Q(P_{th})$ which represents the fuel consumption of the internal combustion engine, $P_{bat}(P_m)$ which represents the current consumption of the electric motor, and λ a weighting factor, and wherein the value relating to the thermomechanical power of said triplet is determined as a function of said weighting factor and of the value relating to the power demanded at the drive wheels.

14. Calculation method according to claim 11, wherein the value relating to the electromechanical power of said triplet is deduced as a function of the value relating to the power demanded at the drive wheels and of the value relating to the thermomechanical power of said triplet.

15. Calculation method according to claim 2, wherein the analytical model of current consumption of the electric motor as a function of the value relating to the electromechanical power that the electric motor must supply is given by the following equation:

$$P_{bat}(P_m) = \begin{cases} a_- \cdot P_m + b \text{ if } P_m \text{ lies between } P_{e,min} \text{ and } 0 \\ a_+ \cdot P_m + b \text{ if } P_m \text{ lies between } 0 \text{ and } P_{e,max} \end{cases}$$

with $a_-$, $a_+$, b, $P_{e,min}$, $P_{e,max}$ parameters calculated as a function of the operating point of the electric motor such that $a_-$ is less than $a_+$.

16. Calculation method according to claim 15, wherein the triplet is obtained by minimising a Hamiltonian that is defined as a function of the current consumption of the electric motor and the fuel consumption of the internal combustion engine.

17. Calculation method according to claim 15, wherein:

the analytical model of current consumption of the electric motor as a function of the value relating to the electromechanical power that the electric motor must supply is given by the following equation:

$$P_{bat}(P_m) = \begin{cases} a_- \cdot P_m + b \text{ if } P_m \text{ lies between } P_{e,min} \text{ and } 0 \\ a_+ \cdot P_m + b \text{ if } P_m \text{ lies between } 0 \text{ and } P_{e,max} \end{cases}$$

with $a_-$, $a_+$, b, $P_{e,min}$, $P_{e,max}$ parameters calculated as a function of the operating point of the electric motor such that $a_-$ is less than $a_+$, the triplet is obtained by minimising a Hamiltonian that is defined as a function of the current consumption of the electric motor and the fuel consumption of the internal combustion engine said Hamiltonian is written in the form:

$$H_{hyb}(P_{th},P_r,\lambda)=Q(P_{th})+\lambda \cdot P_{bat}, \text{ with}$$

$Q(P_{th})$ which represents the fuel consumption of the internal combustion engine, $P_{bat}(P_m)$ which represents the current consumption of the electric motor, and $\lambda$ a weighting factor, and wherein the value relating to the thermomechanical power of said triplet is determined as a function of said weighting factor and of the value relating to the power demanded at the drive wheels.

18. Calculation method according to claim 15, wherein the value relating to the electromechanical power of said triplet is deduced as a function of the value relating to the power demanded at the drive wheels and of the value relating to the thermomechanical power of said triplet.

19. Calculation method according to claim 2, wherein the value relating to the electromechanical power of said triplet is deduced as a function of the value relating to the power demanded at the drive wheels and of the value relating to the thermomechanical power of said triplet.

20. Calculation method according to claim 1, wherein the value relating to the electromechanical power of said triplet is deduced as a function of the value relating to the power demanded at the drive wheels and of the value relating to the thermomechanical power of said triplet.

* * * * *